(12) United States Patent
Sun et al.

(10) Patent No.: US 9,323,838 B2
(45) Date of Patent: Apr. 26, 2016

(54) LABELING PRODUCT IDENTIFIERS AND NAVIGATING PRODUCTS

(71) Applicant: Alibaba Group Holding Limited, Grand Cayman (KY)

(72) Inventors: Changlong Sun, Hangzhou (CN); Anxiang Zeng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 171 days.

(21) Appl. No.: 14/017,161

(22) Filed: Sep. 3, 2013

(65) Prior Publication Data

US 2014/0067815 A1 Mar. 6, 2014

(30) Foreign Application Priority Data

Sep. 5, 2012 (CN) .......................... 2012 1 0326456

(51) Int. Cl.
*G06F 17/30* (2006.01)
(52) U.S. Cl.
CPC .............................. G06F 17/30705 (2013.01)
(58) Field of Classification Search
CPC .................................................. G06F 17/30705
See application file for complete search history.

(56) References Cited

U.S. PATENT DOCUMENTS

| 7,996,282 | B1 | 8/2011 | Scott et al. |
| 8,166,030 | B2 * | 4/2012 | Ryan et al. .................... 707/736 |
| 2003/0212640 | A1 | 11/2003 | Andresen et al. |
| 2006/0212287 | A1 | 9/2006 | Bigalet |
| 2007/0106644 | A1 | 5/2007 | Minerley |
| 2007/0118506 | A1 | 5/2007 | Kao et al. |
| 2008/0114807 | A1 | 5/2008 | Sembower |
| 2009/0177546 | A1 | 7/2009 | Dijk et al. |
| 2009/0204588 | A1 | 8/2009 | Hosono et al. |
| 2009/0271293 | A1 | 10/2009 | Parkhurst et al. |
| 2010/0153187 | A1 | 6/2010 | Ghani et al. |
| 2010/0191748 | A1 * | 7/2010 | Martin et al. .................. 707/750 |
| 2012/0000592 | A1 | 1/2012 | Mase et al. |
| 2012/0030206 | A1 * | 2/2012 | Shi et al. ........................ 707/738 |
| 2012/0066253 | A1 | 3/2012 | Osborn et al. |
| 2012/0095952 | A1 | 4/2012 | Archambeau et al. |
| 2012/0117072 | A1 | 5/2012 | Gokturk et al. |
| 2012/0197764 | A1 | 8/2012 | Nuzzi et al. |

FOREIGN PATENT DOCUMENTS

WO WO2012061301 5/2012

OTHER PUBLICATIONS

PCT Search Report and Written Opinion mailed Mar. 28, 2014 for PCT Application No. PCT/US13/57877, 10 pages.

* cited by examiner

*Primary Examiner* — Mohammad S Rostami
(74) *Attorney, Agent, or Firm* — Lee & Hayes, PLLC

(57) ABSTRACT

The present disclosure provides example methods and apparatuses of labeling product identifiers and methods of navigating products. Description information of one or more products is extracted. The description information of the products is clustered into a text. A subject analysis is applied to the text by using a text analysis method based on subject models to obtain one or more subjects and definition names for the subjects. A subject that is correlated to the description information of the product is used as an identifier of the product to label the product. The present techniques label the products with identifiers that have one or more user dimension attributes so that users may easily and intuitively find their desired products.

14 Claims, 5 Drawing Sheets

LABELING PRODUCT IDENTIFIERS AND NAVIGATING PRODUCTS

CROSS REFERENCE TO RELATED PATENT APPLICATIONS

This application claims foreign priority to Chinese Patent Application No. 201210326456.8 filed on 5 Sep. 2012, entitled "Method and Apparatus of Labeling Product Identifiers and Method of Navigating Products," which is hereby incorporated by reference in its entirety.

TECHNICAL FIELD

The present disclosure relates to the field of e-commerce website navigation, and more specifically, to a method and an apparatus of labeling product identifiers and a method of navigating products.

BACKGROUND

Currently, e-commerce sites are basically using category navigations and attribute navigations to provide navigation information to users.

Most category navigations are represented by tree structures. The users click contents in a category navigation guide to narrow a search, and then use an attribute navigation to precisely find the user's desired products.

Compared to other types of navigations, the attribute navigation is more diversified. However, no matter whether it is generalized or personalized attribute navigation, identifiers displayed by the conventional attribute navigation are fixed attributes of the products and such identifiers are labeled on the products so that the users may find the products through navigation. The identifiers relate to information provided by sellers when the sellers upload the products. The identifiers later pass manual review and are finally labeled on the products. Content displayed by the attribute navigation are also identifiers that describe the fixed attributes of the products. In the example of clothing products, the conventional attribute navigation can only display descriptions of the fixed attributes of clothes such as a brand, a material, a size, a basic style.

In the above conventional techniques, the form of identifiers of product labels is too simplified to benefit the user to choose products. Contents displayed at the navigation guide are just identifiers that describe the fixed attributes of the products. Some identifiers are not easy for the users to understand and cannot directly reflect the users' desires. Currently, the users have attention to the products from more and more perspectives of the products. There are also more and more product types and quantities. Information volume of each product is also larger and larger. It is important to classify such large amount of product information from the attention perspectives of the users.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides a method and an apparatus of labeling product identifiers and a method of navigating products for user to find products.

The present disclosure provides an example method of labeling product identifiers. Description information of one or more products is extracted. The description information of the products is clustered into a text. A subject analysis is applied to the text by using a text analysis method based on subject models to obtain one or more subjects and define names for the subjects. A subject that is correlated to the description information of a respective product is used as an identifier of the respective product to label the product.

The present disclosure also provides an example method of navigating products. Description information of one or more products is extracted. The description information of the products is clustered into a text. A subject analysis is applied to the text by using a text analysis method based on subject models to obtain one or more subjects. The products are correlated to the subjects. The products are navigated by a respective subject correlated to a respective product.

The present disclosure provides an example apparatus of labeling product identifiers. The apparatus may include an extracting module, a generating module, an analyzing module, and a first labeling module. The extracting module extracts description information of one or more products. The generating module clusters the description information of the products into a text. The analyzing module applies a subject analysis to the text by using a text analysis method based on subject models to obtain one or more subjects and define names for the subjects. The first labeling module uses a subject that is correlated to the description information of a respective product as an identifier of the product to label the respective product.

Thus, the present techniques analyze the clustered text of the description information of the products to obtain one or more labels from a perspective of user dimensions to label the products. Different from the conventional navigation techniques, the present techniques are easy for the users to classify and navigate information of the products and may improve accuracy and efficiency of providing the information of the products to the users. The navigation guide or identifiers of the product established by the present techniques are more diversified and intelligent so that the users may more easily find desired products.

BRIEF DESCRIPTION OF THE DRAWINGS

To better illustrate the embodiments of the present disclosure, the following is a brief introduction of the FIGs to be used in the description of the embodiments. It is apparent that the following FIGs only relate to some embodiments of the present disclosure. A person of ordinary skill in the art can obtain other FIGs according to the FIGs in the present disclosure without creative efforts. The example embodiments and their specifications are used to illustrate the present disclosure and shall not constitute inappropriate restrictions to the present disclosure.

DETAILED DESCRIPTION

The present techniques are described in detail below by reference to the FIGS and example embodiments.

The present disclosure provides an example method of labeling product identifiers. Description information of one or more product is extracted. The description information of the products is clustered into a text. A subject analysis is applied to the text by using a text analysis method based on one or more subject models to obtain one or more subjects and define names for the subjects. A subject that is correlated to the description information of a respective product is used as an identifier of the respective product to label the respective product.

Figure 1:
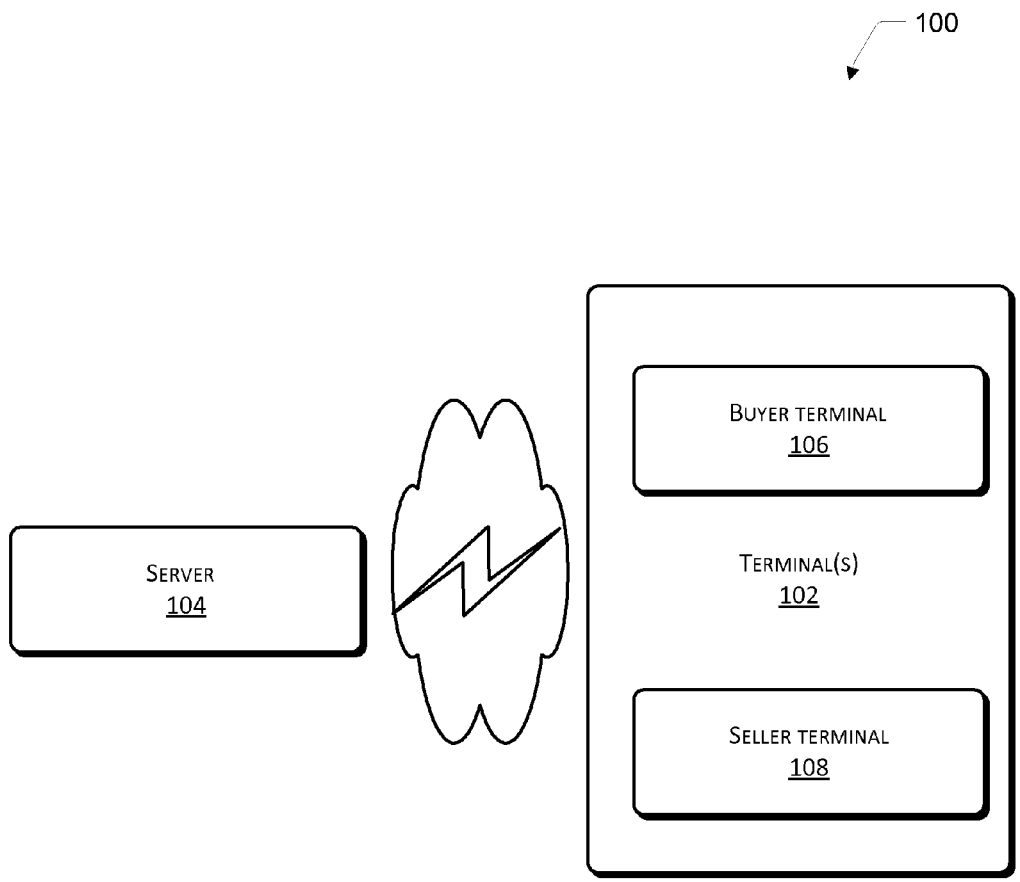
FIG. 1 is a diagram of an example system that implements an example method of labeling product identifiers in accordance with an example embodiment of the present disclosure.

FIG. 1 is a diagram of an example system 100 that implements the example method of labeling product identifiers in accordance with an example embodiment of the present disclosure. The system 100 includes one or more terminal(s) 102 and a server 104. The terminal(s) 102 may include, for example, a buyer terminal 106, and a seller terminal 108. When a seller publishes a product through the seller terminal 106, the server 104 receives description information of the product provided by the seller through the Internet. The description information may include title information and attribute information (which may include a fixed attribute of the product and a user dimension attribute of the product).

For example, the product provided by the seller is a pair of women's shoes. When the seller publishes the product, the seller uploads the title information and the attribute information of the women's shoes, such as material, style, height, etc. The server 104 extracts the description information of the product uploaded by the seller and/or description information of the product previously saved in a database. The product information is clustered into a text. A subject analysis is applied to the text by using a text analysis method based on subject models to obtain one or more subjects and define names for the subjects. A subject that is correlated to the description information of the product is used as an identifier of the product to label the product.

The names of the subjects are defined according to one or more user dimension attributes of the product. The user dimension attributes of the product describe the product from one or more perspectives of a user. Thus, the names of the subjects having user dimension attributes are used as identifiers for labeling the product. Such names are closer to selection habits of the users to select a desired product and enable the users to directly and accurately find the desired product.

Figure 2:
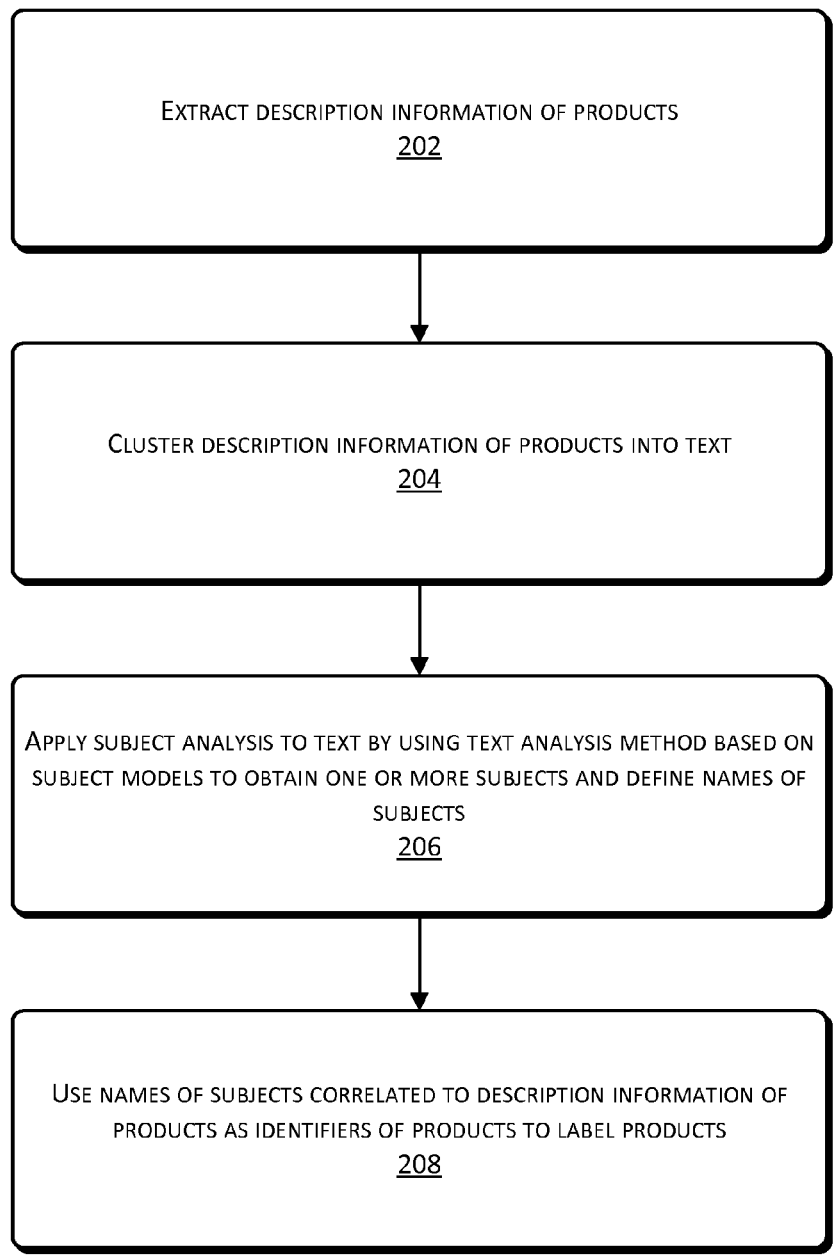
FIG. 2 is a flow chart of an example method of labeling product identifiers in accordance with the example embodiment of the present disclosure.

FIG. 2 is a flow chart of an example method of labeling product identifiers in accordance with the example embodiment of the present disclosure. A performing entity may be hardware such as a server, software, or a combination thereof. The example method of labeling product identifier includes operations from 202 to 208 below.

At 202, description information of products is extracted. The description information may include description information of the product uploaded by the seller and/or description information of the product previously saved in a database.

At 204, the description information of the products is clustered into a text.

For example, products of the same type, such as products of the same model, are clustered. For instance, the products with the same type, such as the same model, may be clustered according to an identical or similar degree between pictures of products. Description information of such products is clustered. The clustered description information is segmented into terms. One or more terms whose term frequencies in the clustered description information that are higher than a first threshold are eliminated and one or more terms whose term frequencies in the clustered description information that are lower than a second threshold are also eliminated. (In other words, terms with frequencies that are too high or too low in the clustered description information are eliminated.) The clustered description information after the elimination of such terms is used as a general description text of the products of the same type or model. The first threshold is higher than the second threshold. The description information of the product, especially the title information of the product, is generally defined by the seller based on selection habits of the users. After the elimination of terms with frequencies that are too high or too low in the description information, some commonly used category terms of the product and some terms relating to the fixed attribute of the product are also eliminated. Thus, the general description text from the above processing includes one or more terms having one or more user dimension attributes.

For example, under a category of women's clothes, there may be more than 90 million products. Products with the same type, such as the same model, may be clustered according to identical or similar pictures of the products. As different sellers may have different description of titles of the products, the titles of the products of the same type or model are clustered to form a text that fully describes the products. The clustered description text may be very complex and long and may be further processed such as by segmenting and eliminating terms with frequencies that are too high or too low. For instance, the clustered description text of women's clothes with a same model may be "2012 medium and long style women cloth elegant lady elastic big size chiffon shirt short sleeved shirt flexible bat T-shirt." After the processing, some search terms with high term frequencies, such as "2012," "women cloth," "short sleeved shirt," "T-shirt," etc., are deleted. The general description text of the particular model of the women's clothes is "medium and long style elegant lady elastic big size chiffon shirt." According to the above method, general description texts of other models of women's clothes are obtained respectively. The general description text of the various models of the women's clothes may be further clustered to form a new text.

At 206, a subject analysis is applied to the text by using a text analysis method based on subject models to obtain one or more subjects and names of the subjects are defined.

An analysis is applied to the clustered text by using the text analysis method based on one or more subject models to identify hidden subject information in a large-scale document collection or corpus. Optionally, probabilistic latent semantic analysis (PLSA) or latent Dirichlet allocation (LDA) method may be used for analysis.

For example, a number of subjects in a training model is set. General description texts of different products are clustered into a new text by using the text analysis method based on the subject models according to the number of subjects.

PLSA or LDA may be applied to the new text. A set of terms in the clustered new text is divided into a number of subsets corresponding to the number of subjects. Each subset may be a set of terms according to their semantic similarity degrees. Each term in the subset has the same or similar semantics. Each subset corresponds to a respective subject. Based on a clustered characteristic or a common attribute of the respective subset, a subject name corresponding to the respective subset is defined. As the text used for analysis is a set of terms that have user dimension attributes, the defined subject names also have certain user dimension attributes.

For example, when the text analysis method based on the subject model is applied to the clustered text relating to women's clothes, a number of subjects in the training model is first set. The general description texts of different types of women's clothes are clustered. Multiple subsets are obtained by using the text analysis method based on the subject model. For instance, a first subject may cluster terms such as see-through, leopard print and thus the first subject may be defined as sexy. A second subject may cluster terms such as attachment or wave cloth, and thus the second subject maybe defined as non-main stream. Similarly, names of another respective subject may be defined based on common characteristics of terms or words included in another subset corresponding to the respective subject.

The set number of subjects may affect the accuracy of the characteristics of terms included in each subset. To select a preferred number of subjects, the number of subjects for the subject model may be increased gradually with a calculation of term distribution in each subject and a calculation of subject distribution in the training text under a respective number of subjects until such distributions converge or reach a threshold. The then corresponding number of subjects is the set number of subjects for the subject model to conduct text analysis.

At 208, a subject that is correlated to the description information of the product is used as an identifier of the product to label the product.

For example, it is determined whether a term in description information of a product is included in the respective subset corresponding to the respective subject. If a result of determination is positive, the description information of the product is correlated to the respective subject corresponding to the respective subset. The correlated subject name is used as the identifier to label the product.

There may be big differences between user dimensions of products under one category and user dimensions of products under another category. The users may pay attention to some specific user dimension attributes of the product under one category and other specific user dimension attributes of products under another category. The description information of the products under a same category may have more inherent correlations or relevancies and thus it is easier to obtain the user dimension attributes under the same category for the attention of the user by using the subject analysis.

For example, to increase the accuracy of labeling a product identifier by using the subject analysis based on the subject model, the text for subject analysis may be description information of the products under a same category.

Thus, the example method of labeling a product identifier may include categorizing the products before operations at 202. At 202, the extracting description information further includes extracting description information of the products under the same category. At 204, the clustering the description information of the products into the text further includes clustering the description information of the products under the same category into the text.

For another example, based on the accuracy of clustering products, the clustering of description information of the products under the same category may be the clustering of description information of a portion of the products under the same category.

The categorization of the products may use a general categorization method. The products sold online generally already have their corresponding main categories and sub-categories. Thus, the present techniques may extract information of the existing main categories and/or sub-categories of the products to determine the categories of the products.

For example, a product sold by the seller online may be women's T-shirts. The product is determined to belong to the category of women's clothes. A title of the product is "fat and enlarged colored short-sleeved T-shirt". Title information of various products under the category of women's clothes are clustered to conduct the subject analysis to obtain a subset including terms such as large, enlarged, super-large, supra-large, fat, fatten, fat guy, large size, etc. A subject corresponding to the subset is defined as "large size". As the title information of the women's clothes in this example includes "fat and enlarged", the T-shirt and its description information are correlated to the subject "large size". Thus, the "large size" may be used as an identifier of a product that description information includes at least one term in "large, enlarged, super-large, supra-large, fat, fatten, fat guy, large size". In this example, the title information of the women's clothes includes the term "fat and enlarged" and thus the "large size" may be used as the product identifier. The products under each category may be labeled by using the same or similar method.

For example, the categories may include standard categories and non-standard categories. If one or more key fixed attributes of products are clustered into a node to accurately find a category including products with the same nature, the category is a standard category. For instance, with respect to products under a category of cell phone, a combination of brand and type may cluster products that satisfy such node under the category of cell phone. Thus, the category of cell phone is the standard category. A non-standard category has a concept as opposed to the standard category. If one or more key fixed attributes of products cannot be clustered into the node to accurately find products and normalize the products into a category, such category is a non-standard category. For instance, with respect to products under the category of women's clothes, if several key fixed attributes of the products cannot be used to accurately find the user's desired products, the category of women's clothes is the non-standard category.

Therefore, based on the characteristics of attributes of products under the non-standard categories and the characteristics of attributes of products under the standard categories, compared with the products under the standard categories, the present techniques may be more suitable for labeling identifiers of products under the non-standard categories. In addition to the example methods as described in the example embodiments for labeling identifiers of the products, some other methods may also be used to label identifiers of the products under the non-standard categories.

In addition, the title information in the description information of the products may also be used as additional identifiers of the product.

For example, the present techniques determine whether title information of a product include an additional identifier in an additional identifier database pre-established for the categories of the product. If a result of determining is positive, the additional identifier is obtained and used as a label of the product when the identifiers of the product to be identified are obtained.

For example, the additional identifiers in the additional identifier database may be defined for popular products so that it is easier for the users to find the current popular products.

For instance, the title information of the product women's T-shirt is "fat and enlarged colored short-sleeved T-shirt." The present techniques search an additional identifier database under the category of women's clothes to find whether there is content in the additional identifier database included in the title information. If it is found that the title information includes an identifier "colored" in the additional identifier database, the product is assigned the additional identifier "colored" and the women's T-shirt is labeled with the identifier "colored."

The additional identifier database may be pre-established. For example, one or more inquiry terms with high inquiry frequency are extracted according to a log file of the products under the same category within a period of time such as one month (e.g., numbers of clicks and views of the products). The extracted inquiry terms are segmented. After category words and the stop words are deleted, the remaining words after the processing are used as keywords. The keywords are used as popular identifiers or additional identifiers to establish the additional identifier database under each category. The inquiry terms may be various words. Thus, the additional identifiers have no restrictions on the words. Words describing a product appearance, human name, film name, etc. may all be used as additional identifiers.

For example, under the category of women's clothes, inquiry terms with high inquiry frequency may include "see-through blouses", "see-through short-sleeves", etc. After the processing of segmentation and removing the category words and the stop words, an obtained keyword is "see-through". Thus, the word "see-through" may be used as the additional identifier in the additional identifier database under the category of women's clothes. For another example, one celebrity may currently be popular. A search volume of a model of women's clothes worn by the celebrity is high. A name of the celebrity may be used as the additional identifier in the additional identifier database under the category of women's clothes.

Figure 3:
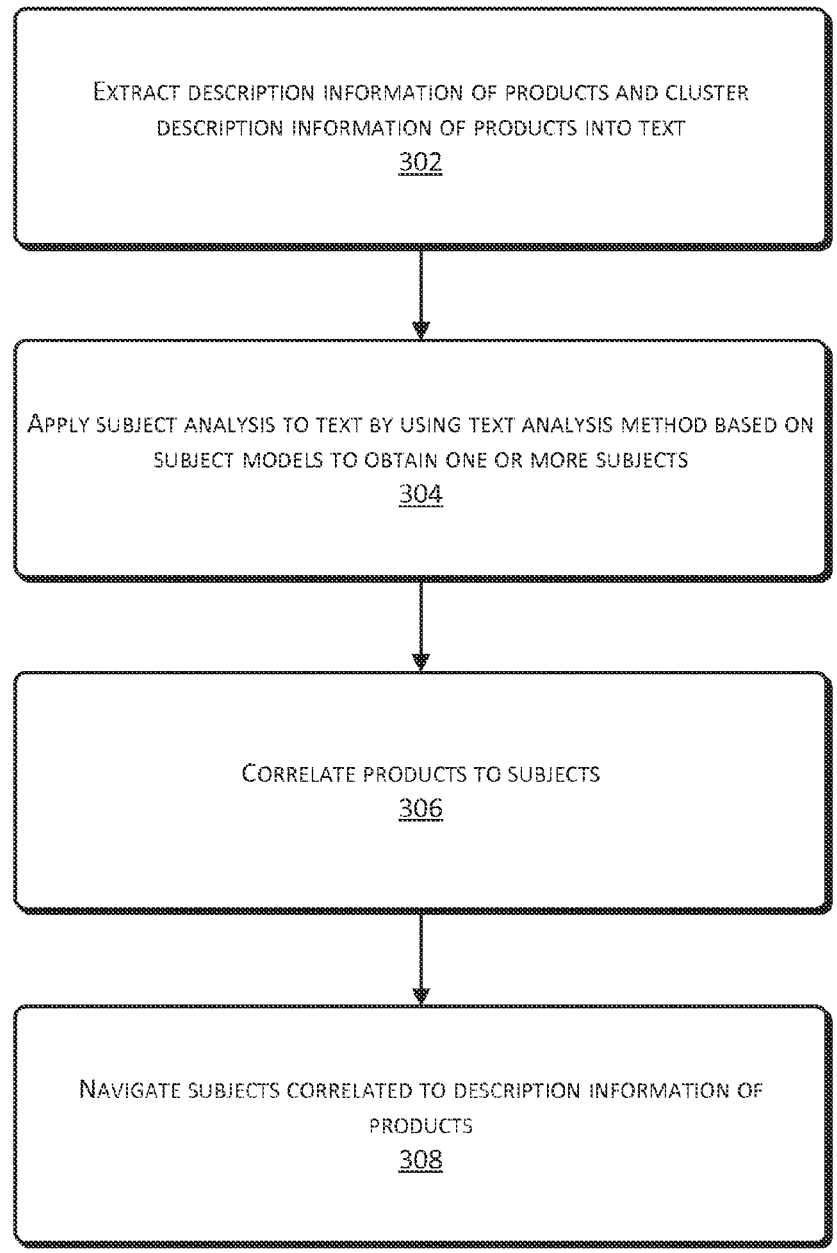
FIG. 3 is a flow chart of an example method of navigating products in accordance with the example embodiment of the present disclosure.

The present disclosure also provides an example method for navigating products as shown in FIG. 3.

At 302, description information of products is extracted and the description information of the products is clustered into a text.

For example, the description information of the products may include the title information and/or the attribute information of the products. Generally, the titles of the products describe the products from the perspective of the users' attention. Thus, the titles may include many terms or a combination of terms that may attract the users' interests. In addition, the descriptions of details of the products that describe the attributes of the products in detail may also include descriptions from the perspective of the users' attention. To cluster the description information of the products into the text is to cluster a set of description terms of the products into the text.

At 304, a subject analysis is applied to the text by using a text analysis method based on subject models to obtain one or more subjects.

An analysis is applied to the clustered text by using the text analysis method based on one or more subject models to identify hidden subject information in a large-scale document collection or corpus. Optionally, probabilistic latent semantic analysis (PLSA) or latent Dirichlet allocation (LDA) method may be used for training model is set.

For example, a number of subjects in the one or more subject models is set. The text analysis method based on the subject models according to the number of subjects, through the PLSA or LDA, may be applied to the text clustered by the description information of the products to divide a term set in the text into a number of subsets corresponding to the number of subjects. Each subset may be a set of terms including close or similar terms according to their semantic similarity degrees. Each term in the subset has the same or similar semantics or application scenarios. Each subset corresponds to one subject. Based on a clustered characteristic of a respective subset, a subject corresponding to the respective subset is defined. Based on one or more common attributes of the respective subset, a subject name corresponding to the respective subset is defined. The subject name may be used as the identifier of the products under the category.

At 306, the products are correlated to the subjects.

According to a distribution of terms in the description information of each product in the subset, a mapping between each product and each subset is established. Further, a mapping between the products and the subjects are established.

At 308, the subjects correlated to the description information of the products are navigated by classifications.

Different products may be correlated with different subjects. Thus, when the users view products, the products may be displayed respectively corresponding to their subjects. The users choose a link or an identifier or label corresponding to the respective subject to obtain the products correlated with the respective subject. That is, the products are navigated according to classifications of their subjects. Names or identifiers corresponding to the subjects are used as contents displayed in the navigation. When the users click the identifier, the products correlated with the subject are displayed. A display sequence of the names or identifiers corresponding to the subjects may be determined according to the number of clicks of the products under the subsets according to the names or identifiers. It is not necessary for a navigation guide to show all names or labels corresponding to all subjects. Based on different scenarios, a number and sequence of displayed names or labels corresponding to the subjects may be set.

When the respective subject in the navigation guide is selected, the products correlated with the respective subject are displayed at a user interface. When multiple subjects in the navigation guide are selected, the products correlated to the multiple subjects are displayed at the user interface.

For example, in the example method for navigating products, to remove the category words or terms unrelated to the product attributes in the description information, the operations at 302 may further include the following. The description information of the products under a same model is clustered into a first text. The first text is segmented. One or more terms whose term frequencies are higher than a first set threshold and one or more terms whose term frequencies are lower than a second set threshold are removed. First texts of different models are clustered into a second text. At 304, the text that is used for subject analysis by the method for text analysis based on the subject models may be the second text.

The operations at 304 may further include the following. A number of subjects in the subject model is set. The subject model is used to apply the subject analysis to the second text. Subsets corresponding to the set number of subjects are obtained. The subject for each subset is defined. According to the subset that terms in the description information located, the products under the category are correlated with the subject corresponding to the subset. When the subject of each subset is defined, the common semantics or common attributes of terms in the subset may be used as the name of the subject.

For example, the text used in the subject analysis may be the description information of the products under the same category. The example method for labeling product identifiers may also include the following operations to categorize the products. At 302, the operations of extracting the description information of the products may further include extracting the description information of the products under the same category. At 304, the operations for clustering the description information of the products may further include clustering the description information of the products under the same category.

According to an accuracy degree of clustering the products, the clustering of the description information of the products under the same category may be a clustering of a portion of the description information of the products under the same category.

Figure 4:
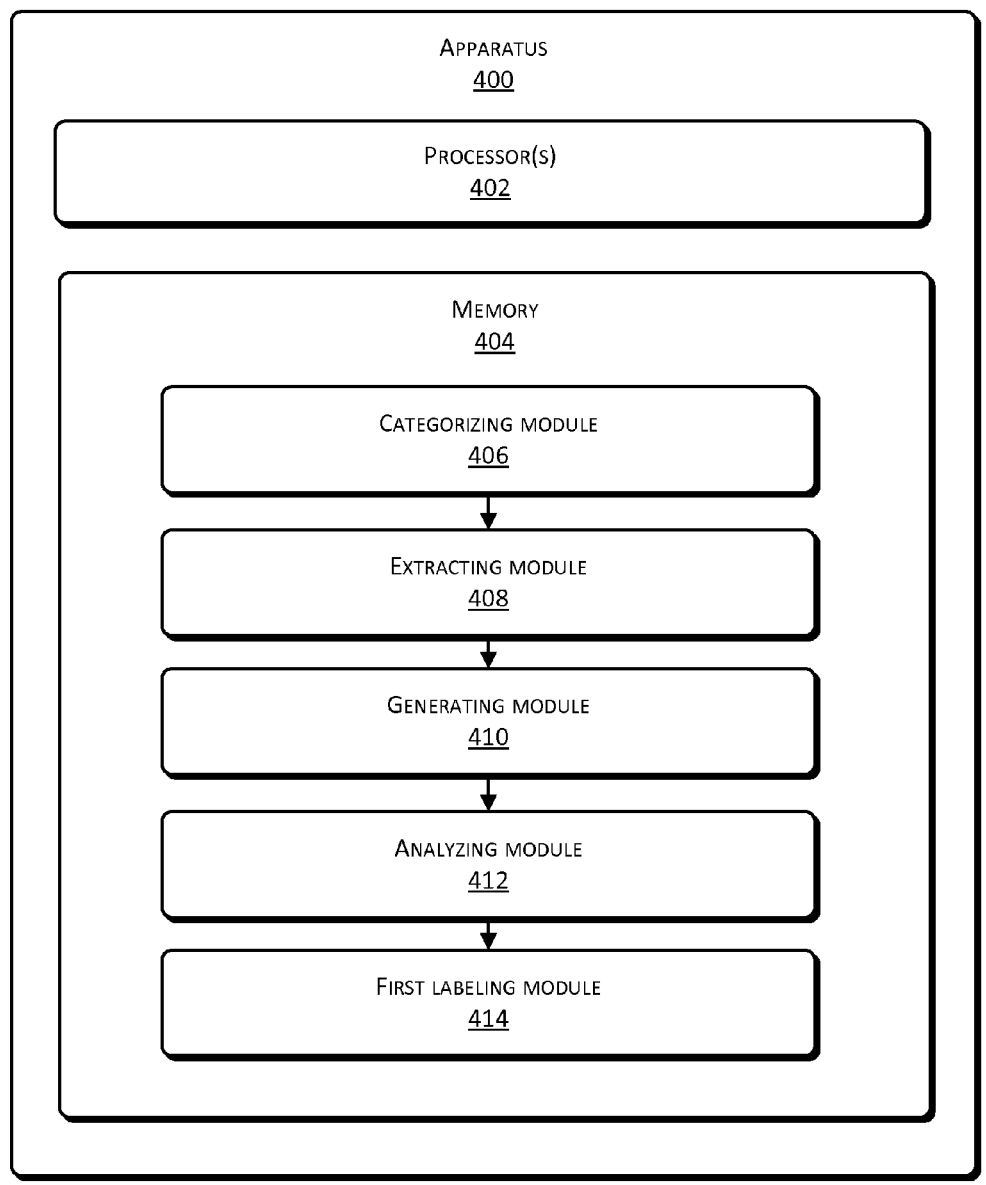
FIG. 4 is a diagram of an example apparatus of labeling product identifiers in accordance with the example embodiment of the present disclosure.

Correspondingly, the present disclosure also provides an apparatus for labeling product identifiers. FIG. 4 is a diagram of an example apparatus 400 of labeling product identifier in accordance with the example embodiment of the present disclosure. The apparatus 400 may include one or more processor(s) 402 and memory 404. The memory 404 is an example of computer-readable media. As used herein, "computer-readable media" includes computer storage media and communication media.

Computer storage media includes volatile and non-volatile, removable and non-removable media implemented in any method or technology for storage of information such as computer-executed instructions, data structures, program modules, or other data. In contrast, communication media may embody computer-readable instructions, data structures, program modules, or other data in a modulated data signal, such as a carrier wave. As defined herein, computer storage media does not include communication media. The memory 404 may store therein program units or modules and program data.

In the example of FIG. 4, the memory 404 may store therein a categorizing module 406, an extracting module 408, a generating module 410, an analyzing module 412, and a first labeling module 414. The categorizing module 406 categorizes products. Categories are classified based on the recorded product data, such as cell phone, camera, women's clothes, men's clothes, books, etc.

For example, the categorizing module 406, based on description information of a respective product or a category selected by a seller when uploading the respective product, determines a category of the respective product in the classified categories.

The extracting module 408 extracts description information of the products. For example, the extracting module 408 may extract description information of the products under a same category. The description information may include description information of the products when the seller uploads the products. The description information may also include description information under the category recorded in a database.

The generating module 410 clusters the description information of the products into a text. For example, the generating module 410 may, according to an identical or similar degree between pictures of the products, cluster products with the same model under the same category. Description information of the products with the same model is clustered. The clustered description information is segmented. One or more terms whose term frequency in the clustered description information is higher than a first threshold are eliminated and one or more terms whose term frequency in the clustered description information is lower than a second threshold are eliminated too. (In other words, terms with frequencies that are too high or too low in the clustered description information are eliminated.) The clustered description information after the elimination of such terms is used as a general description text of the same product. The first threshold is higher than the second threshold. As the description information of the products, especially the title information of the products, is generally defined by the seller based on selecting customs of users, after the elimination of the terms with frequencies that are too high or too low in the description information, some commonly used category words for the product and some words relating to the fixed attribute of the product are deleted. Thus, the general description text after the above processing includes one or more terms having one or more user dimension attributes.

The analyzing module 412 applies a subject analysis to the text by using a text analysis method based on one or more subject models to obtain one or more subjects and define names for the subjects. The analyzed text is the second text.

For example, the analyzing module 412 may apply the text analysis method based on one or more subject models to the clustered text to identify hidden subject information in a large-scale document collection or corpus. Optionally, probabilistic latent semantic analysis (PLSA) or a latent Dirichlet allocation (LDA) method may be used for analysis.

For example, the analyzing module 412 may set a number of subjects in a training model, cluster general description texts of different products into a new text by using the text analysis method based on the subject models according to the number of subjects. The analyzing module 412 may apply the PLSA or LDA to the new text to divide a set of terms in the clustered text into a number of subsets corresponding to the number of subjects. Each subset may be a set of terms clustered according to their semantic identical or similarity degrees. Each term in the subset has same or similar semantics. Each subset corresponds to one subject. Based on a clustered characteristic or a common attribute of a respective subset, a subject name corresponding to the respective subset is defined. As the text used for analysis is a set of terms that have user dimension attributes, the defined subject names also have certain user dimension attributes.

The first labeling module 414 uses a subject that is correlated to the description information of the products as an identifier of the products to label the products.

For example, the first labeling module 414 determines whether a term in description information of product is included in the respective subset corresponding to the respective subject. If a result of determination is positive, the description information of the product is correlated to the respective subject corresponding to the respective subset. The correlated subject name is used as the identifier to label the product.

Figure 5:
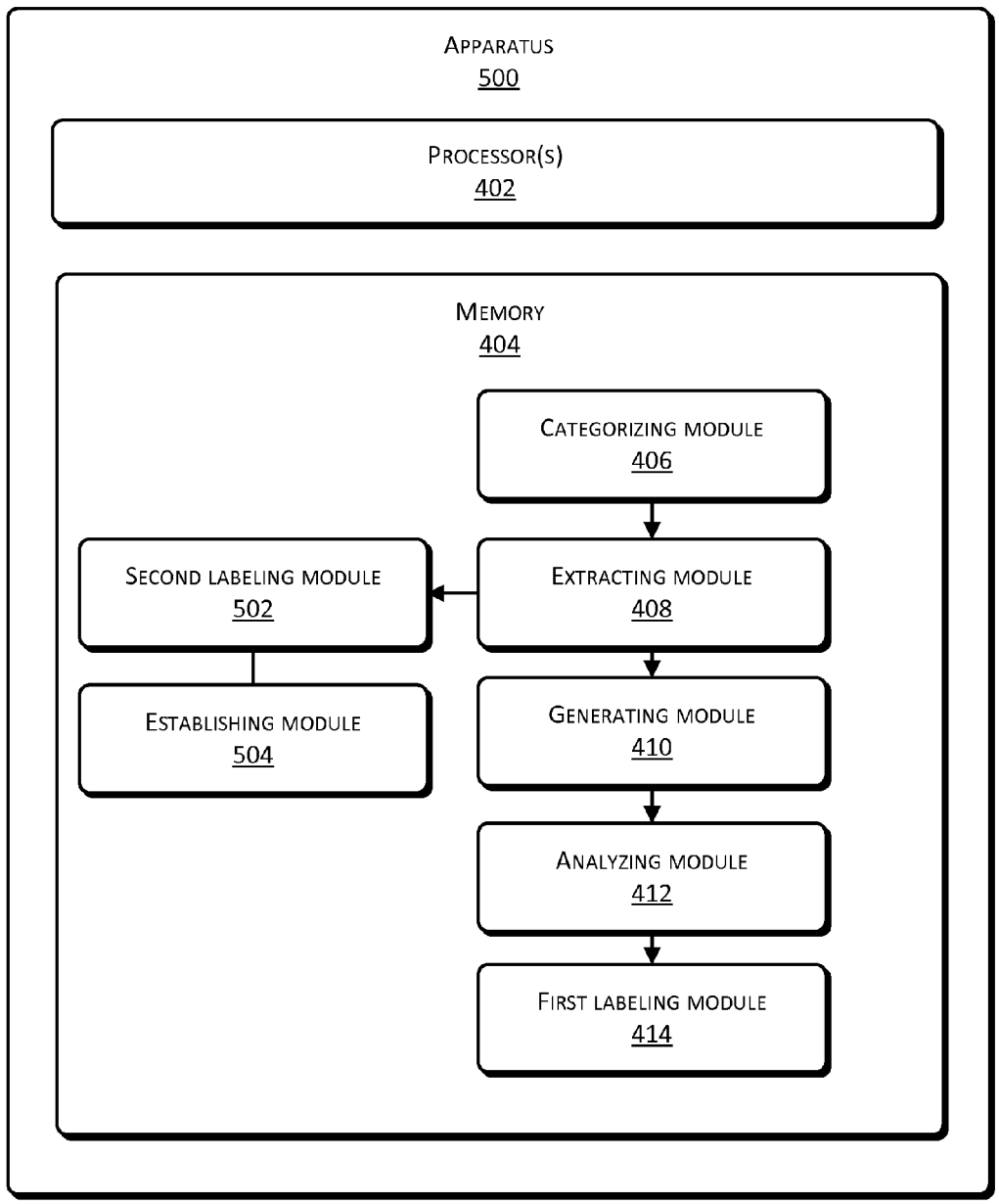
FIG. 5 is a diagram of another example apparatus of labeling product identifiers in accordance with the example embodiment of the present disclosure.

FIG. 5 is a diagram of another example apparatus 500 of labeling product identifier in accordance with the example embodiment of the present disclosure. Based on the apparatus 400, the apparatus 500 may further include a second labeling module 502 and an establishing module 504 stored in the memory 404.

The second labeling module 502 determines whether the title information of the products includes an additional identifier in an additional identifier database pre-established for the categories of the products. If a result of determining is positive, the additional identifier is obtained and used for identification when the identifiers of the products to be identified are obtained.

The establishing module 504 pre-establishes the additional identifier database. The establishing module 504, according to a log that records the products under the same category, extracts one or more inquiry terms with high inquiry frequency within a period of time, such as one month, segments the extracted inquiry terms, removes the category words and the stop words, and obtains one or more keywords. The keywords are used as the additional identifiers to establish the additional identifier database under the category.

The methods and apparatuses of labeling product identifiers and the methods of navigating products accordance with the present disclosure may label the products by using the identifiers having user dimension attributes and establish the navigation guide for navigating the products. Thus, the users may more easily and intuitively find their desired products.

One of ordinary skill in the art would understand that the modules and operations as described in the present disclosure may be implemented by hardware, computer software, or a combination thereof. To illustrate the interchangeability between hardware and software, the present disclosure generally describes components and operations in each example embodiment according to their functionalities. Whether such functionalities are implemented by hardware or software is dependent on specific applications of technical solutions and design constraints. One of ordinary skill in the art would use different methods for different specific application scenarios to implement the described functionalities. Such implementation shall not be deemed as out of the protection scope of the present disclosure.

The present techniques may be implemented through hardware, software modules executed by one or more processors, or a combination thereof. The hardware may be implemented by specific logic. The software module may be stored in random access memory (RAM), memory, read-only memory (ROM), programmable read-only memory (PROM), erasable programmable read only memory (EPROM), register storage, hard disk, portable disk, CD-ROM, or any other computer storage media well-known in the art.

The above descriptions illustrate example embodiments of the present disclosure relating to the purpose, techniques, and beneficial effects of the present disclosure. The above descriptions are merely for illustrating the example embodiments and are not intended to limit the scope of the present disclosure. It should be understood by one of ordinary skill in the art that certain modifications, replacements, and improvements can be made and should still be considered under the protection of the present disclosure without departing from the principles of the present disclosure.

What is claimed is:

1. A method comprising:
    extracting description information of multiple products;
    clustering the description information of the multiple products belonging to a particular model into a first text;
    processing the first text by segmenting the first text to one of
    remove from the first text one or more terms whose term frequencies are higher than a first set threshold, and
    remove from the first text one or more terms whose term frequencies are lower than a second set threshold;
    clustering, after processing the first text, first texts of products belonging to different models into a second text;
    applying a subject analysis to the second text to obtain one or more subjects;
    defining one or more names for the one or more subjects respectively;
    assigning a respective name of a respective subject correlated to description information of a respective product as an identifier of the respective product; and
    labeling the respective product by using the identifier,
    wherein the applying the subject analysis to the second text to obtain one or more subjects comprises:
    setting a number of subjects in one or more subject models;
    applying the subject analysis to the second text by using a text analysis method based on the one or more subject models;
    obtaining a number of subsets corresponding to the number of subjects from a set of terms in the second text, the number of subsets being equal to the number of subjects, a respective subset corresponding to a respective subject; and
    according to the respective subset that one or more terms in the description information of the products locate, correlating the description information of the products to the respective subject corresponding to the respective subset.

2. The method as recited in claim 1, further comprising:
    prior to the extracting the description information of the multiple products, categorizing the multiple products,
    wherein the extracting the description information of the multiple products comprises extracting description information of multiple products under a particular category, and
    the second text includes the description information of the multiple products under the particular category.

3. The method as recited in claim 1, wherein the one or more subject models include a probabilistic latent semantic analysis (PLSA) or a latent Dirichlet allocation (LDA).

4. The method as recited in claim 1, wherein the description information of the multiple products comprises title information, attribute information, or a combination of the title information and the attribute information.

5. The method as recited in claim 1, wherein the description information includes title information, the method further comprising:
    determining whether the title information of the respective product includes an additional identifier in an additional identifier database that is pre-established for a particular category that the respective product belongs; and
    in response to determining that the title information of the respective product includes the additional identifier, obtaining the additional identifier, and using the additional identifier to label the respective product.

6. The method as recited in claim 5, further comprising establishing the additional identifier database, the establishing including:
    according to a log of products under the particular category, extracting one or more inquiry terms whose inquiry frequencies are higher than a preset threshold, segmenting the extracted one or more inquiry terms;
    removing one or more category words and stop words to obtain one or more keywords; and
    assigning the one or more keywords as additional identifiers to establish the additional identifier database.

7. A method comprising:
    extracting description information of multiple products;
    clustering the description information of the multiple products belonging to a particular model into a first text;
    processing the first text by segmenting the first text to one of:
    remove from the first text one or more terms whose term frequencies are higher than a first set threshold, and remove from the first text one or more terms whose term frequencies are lower than a second set threshold;

clustering, after processing the first text, first texts of products belonging to different models into a second text;

applying a subject analysis to the second text to obtain one or more subjects;

correlating the multiple products to the one or more subjects; and navigating the multiple products according to a respective subject correlated to a respective product, wherein the applying the subject analysis to the second text to obtain one or more subjects comprises:

setting a number of subjects in one or more subject models;

applying the subject analysis to the second text by using a text analysis method based on the one or more subject models;

obtaining a number of subsets corresponding to the number of subjects from a set of terms included in the second text, the number of subsets being equal to the number of subjects, a respective subset corresponding to a respective subject; and according to the respective subset that one or more terms in the description information of the products locate, correlating the description information of the products to the respective subject corresponding to the respective subset.

8. The method as recited in claim 7, further comprising:

prior to the extracting the description information of the multiple products, categorizing the multiple products, wherein the extracting the description information of the multiple products comprises extracting description information of multiple products under a particular category and the second text includes the description information of the multiple products under the particular category.

9. The method as recited in claim 7, wherein the description information of the multiple products comprises title information, attribute information, or a combination of the title information and the attribute information.

10. The method as recited in claim 7, wherein the navigating the multiple products according to the respective subject correlated to the respective product comprises:

determining a display sequence of the one or more subjects according to numbers of clicks of the products corresponding to the subjects respectively; and displaying the one or more subjects in a navigation guide at a user interface according to the display sequence.

11. An apparatus comprising a memory and a processor that executes computer executable instructions stored in the memory to cause the processor to:

extract description information of multiple products;

cluster the description information of the multiple products belonging to a particular model into a first text;

process the first text by segmenting the first text to one of remove from the first text one or more terms whose term frequencies are higher than a first set threshold, and remove from the first text one or more terms whose term frequencies are lower than a second set threshold;

cluster, after the first text is processed, first texts of products belonging to different models into a second text;

apply a subject analysis to the second text to obtain one or more subjects and defines one or more names for the one or more subjects, respectively; and assign a respective name of a respective subject correlated to description information of a respective product as an identifier of the respective product and label the respective product by using the identifier, wherein the computer executable instructions stored in the memory cause the processor to:

set a number of subjects in one or more subject models;

apply the subject analysis to the second text by using a text analysis method based on the one or more subject models;

obtain a number of subsets corresponding to the number of subjects from a set of terms included in the second text, the number of subsets being equal to the number of subjects, a respective subset corresponding to a respective subject; and according to the respective subset that one or more terms in the description information of the products locate, correlate the description information of the products to the respective subject corresponding to the respective subset.

12. The apparatus as recited in claim 11, wherein the description information of the multiple products comprises title information, and the computer executable instructions stored in the memory cause the processor to:

determine whether the title information of the respective product includes an additional identifier in an additional identifier database pre-established for a particular category that the respective product belongs; and in response to a result of determining that is positive, obtain the additional identifier and uses the additional identifier in addition to the identifier to label the respective product.

13. The apparatus as recited in claim 12, wherein the computer executable instructions stored in the memory cause the processor to:

according to a log of products under the particular category, extract one or more inquiry terms whose inquiry times are higher than a preset threshold;

segment the extracted one or more inquiry terms;

remove one or more category words and stop words to obtain one or more keywords; and use the one or more keywords as additional identifiers to establish the additional identifier database.

14. The method as recited in claim 7, wherein the one or more subject models include a probabilistic latent semantic analysis (PLSA) or a latent Dirichlet allocation (LDA).

* * * * *